Oct. 28, 1969  M. D. McNAMEE  3,475,048
PANEL TRUCK CAMPER AND METHOD OF CONVERSION
Filed Aug. 12, 1967  3 Sheets-Sheet 1
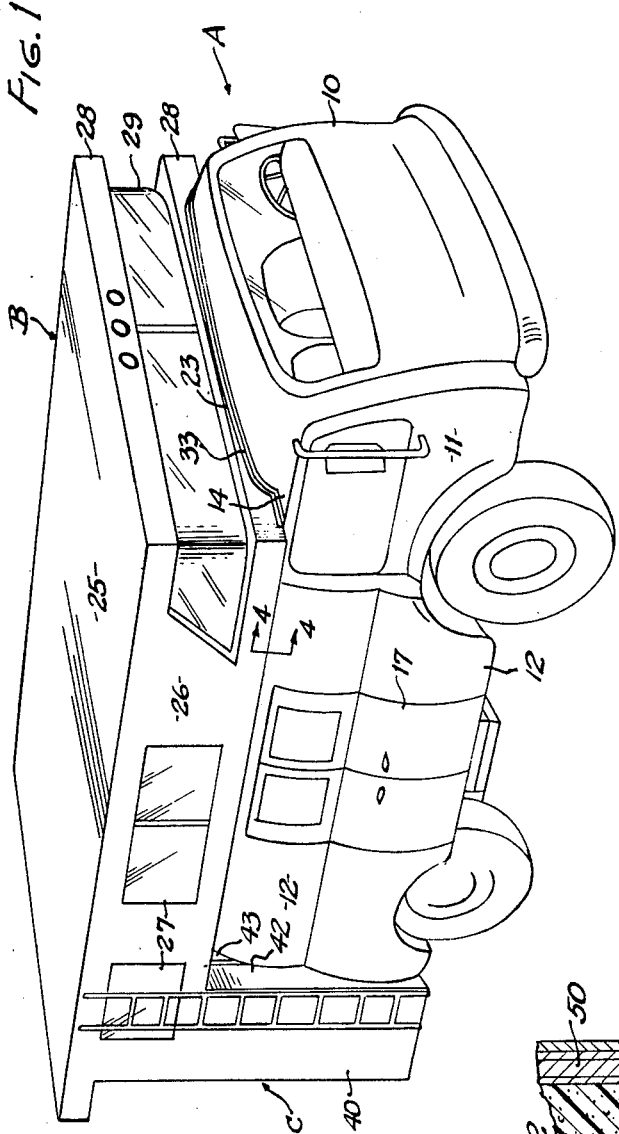
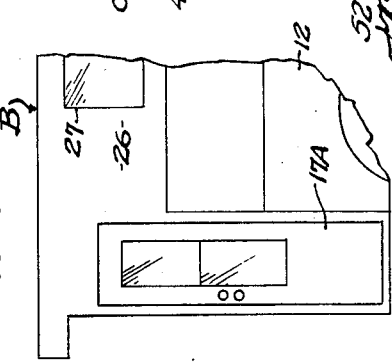
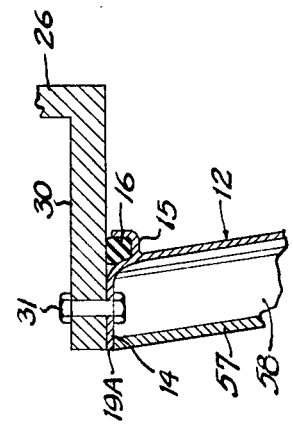
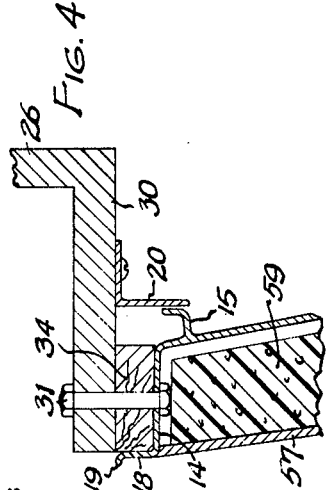
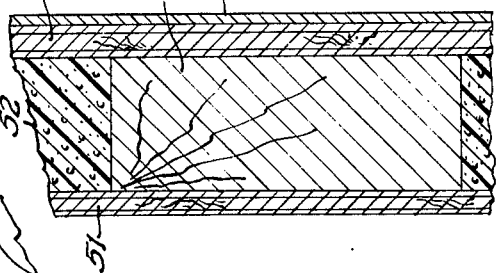
INVENTOR
MERLE D. McNAMEE
BY Lynn N Latta
—ATTORNEY—

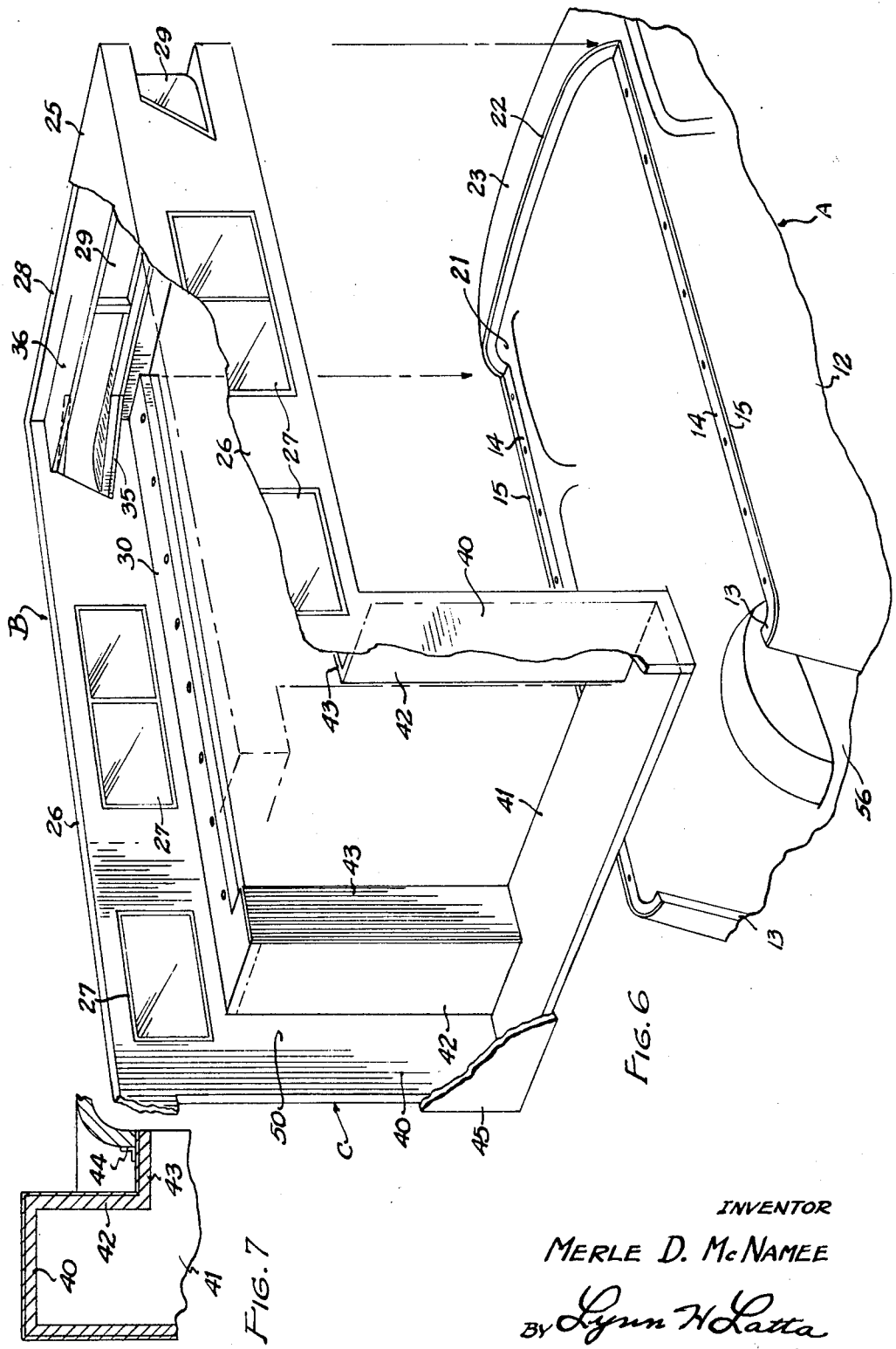

Oct. 28, 1969     M. D. McNAMEE     3,475,048
PANEL TRUCK CAMPER AND METHOD OF CONVERSION
Filed Aug. 12, 1967     3 Sheets-Sheet 3
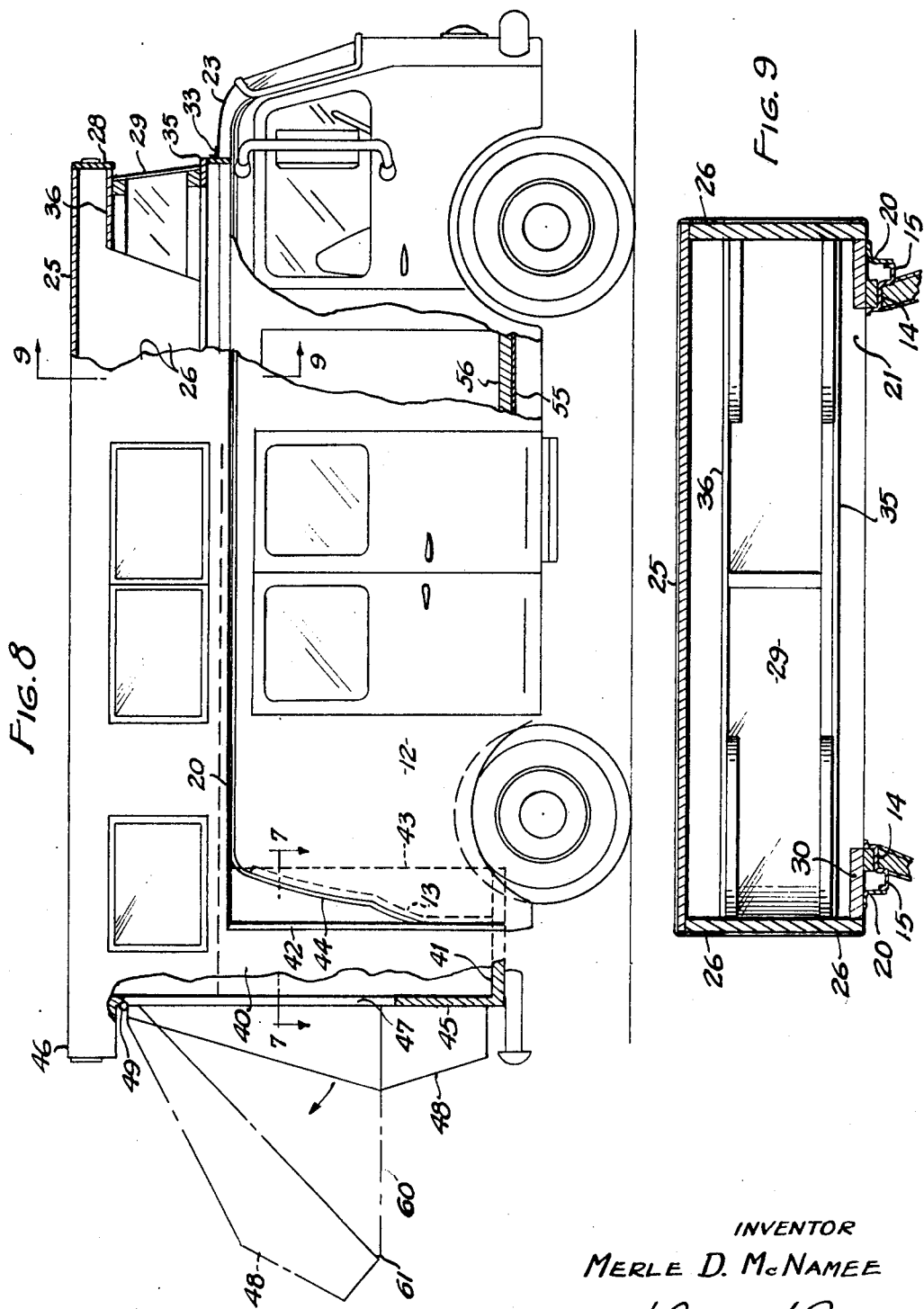
INVENTOR
MERLE D. McNAMEE
BY Lynn H. Latta
ATTORNEY United States Patent Office 3,475,048
Patented Oct. 28, 1969

3,475,048
PANEL TRUCK CAMPER AND METHOD OF CONVERSION
Merle D. McNamee, San Gabriel, Calif. (2510 Rosemead Blvd., South El Monte, Calif. 91733)
Filed Aug. 12, 1967, Ser. No. 667,311
Int. Cl. B60p 3/34
U.S. Cl. 296—23  11 Claims

ABSTRACT OF THE DISCLOSURE

Disclosed herein is a mobile home of the camper type composed of a panel truck combined with a camper body attachment which expands the space within the panel truck body upwardly and rearwardly so as to accommodate a full complement of mobile home living-quarter facilities, one of the panel truck doors being left intact in operative condition for access to the living quarters.

BACKGROUND OF THE INVENTION

Heretofore the common practice in the construction of campers has been to fabricate a camper body superstructure which is superimposed upon the shallow open bed of a pickup truck or a larger truck having the shallow open bed type of cargo-carrying body. The horizontal plane of junction between the truck bed and the camper body is at a level approximately one-third of the height of the composite body from floor to roof level, and since it is common practice to extend the sides of the camper body to a greater width than that of the truck bed, there is a resulting overhang at both sides of the camper, at the level of the truck bed rim, which inherently has resulted in a box-like, makeshift appearance of the camper body, and it has been extremely difficult to achieve an overall body design of pleasing appearance. Also, the majority of the conventional camper body is fabricated by the camper manufacturer, who in all instances is a relatively small manufacturer, having no facilities, such as those employed by the large auto makers, for the fabrication of formed sheet-steel vehicle bodies, and consequently the common practice is to fabricate the camper body with walls of plywood covered by thin sheet aluminum skin, which is of limited structural strength. Consequently, the resistance to demolition of the body in the event of a serious highway accident, is low compared to that of an ordinary auto body of sheet metal.

RESUME OF INVENTION

This invention provides a camper which combines a panel truck, with its roof cut away and its rear doors removed, with a camper body comprising a relatively shallow top section superimposed upon and sealed to the open top of the panel truck body, and a rear section which is joined to the open rear end of the panel truck body, such rear section including a floor portion providing an extension of the panel truck floor, and lateral wings which project outwardly of the panel truck sides and are joined to the rear doors posts by vertical offset walls. Such wings provide convenient spaces for facilities such as cabinet, toilet, lavatory, and the like. The invention also provides a sandwich wall structure of greatly increased inherent structural strength.

The combination provides a composite body design of greatly improved appearance. It provides a much higher body strength to protect occupants in the event of a collision. It provides for rearward extension of the floor area of the original vehicle with improved integration of design and structure as between the panel truck body and the attachment body. It furnishes overhead shelf space provided for by horizontal offset sills along the horizontal lower side margins of the top section of the camper body. Such horizontal offset walls are also utilized for sealing the top section to the upper margins of the panel truck side walls. The invention has among its objects to incorporate these features in a camper type mobile home.

These and other objects will become apparent in the ensuing description, coupled with the appended drawings, wherein:

FIG. 1 is a perspective view of a camper vehicle embodying the invention;

FIG. 2 is a fragmentary side elevational view of the rear end portion of a modified form of the invention;

FIG. 3 is a detail full-scale cross-sectional view of the laminated wall structure of the attachment body;

FIG. 4 is a detail cross-sectional view of a lateral sill joint thereof, taken on line 4—4 of FIG. 1;

FIG. 5 is a detail cross-sectional view of a modified form of the sill joint;

FIG. 6 is an exploded, fragmentary perspective view of the camper components;

FIG. 7 is a detail horizontal sectional view taken on line 7—7 of FIG. 8;

FIG. 8 is a broken-away side elevational view of the camper of FIG. 1, modified by the addition of a rear-extension bed section; and FIG. 9 is a cross-sectional view of the same taken on line 9—9 of FIG. 8.

DESCRIPTION

Referring now to the drawings in detail, I have shown therein, as an example of one form in which the invention may be embodied, a camper comprising, in general, a panel truck A; and a camper body including a top section B joined to the upper side margins and cab of the panel truck body, and a rear extension section C joined to the rear door posts of the panel truck body.

The panel truck A comprises a driver's cab 10 having conventional doors 11 at its respective sides, and a sheet metal (steel or equivalent) body comprising essentially a pair of side panels 12 having rear door posts 13 (FIG. 6) at their rear ends, having (FIG. 4) horizontal shoulder flanges 14 (vestigial remains of a cut-away roof) along their upper margins, and having rain gutters 15 extending along the flanges 14. In the modified form, FIG. 5, the gutter 15 functions to contain a sealant strip 16 for weather-sealing the top section B to the side panels 11. It also functions (in both forms) to reinforce and strengthen the shoulder flange 14 and to cooperate therewith in supporting the top section B. The panel truck body further includes side doors 17 at each side thereof. The doors 17 at one side of the body are secured in permanently shut condition, and the doors 17 at the other side (e.g. the side seen in FIG. 1) are left in their operative condition to provide access to the living quarters within the camper body.

In the form of the invention shown in FIG. 2, all of the side doors of the van body are secured permanently closed, and a door 17A is provided in one side of vertical body section C.

In the form of the invention shown in FIGS. 1 and 4, the shoulder 14 is bordered by a vertical flange 18 which remains as a side marginal portion of the original panel truck roof which has been cut away (e.g. by use of a cutting torch) leaving a cut edge 19, and additional bracing is provided for by a weather strip 20 of angle iron which is welded to the outer face of the gutter 15. The space between strip 20 and the opposed upper margin of panel 11 may be left unfilled as shown in FIG. 4, to provide a dead air space, or may be filled with sealant as in FIG. 5.

In FIG. 5, shoulder 14 is cut off along its inner margin, leaving a cut edge 19A. Cut edges 19, 19A define a top opening 21 (FIG. 6) which communicates with the interior of top camper body section B.

The roof of cab 10 is cut away in a vertical plane intermediate the front and back of the cab, leaving a cut edge 22 (FIG. 6) lying in that plane, and an arched roof section 23 extending from the edge 22 to the windshield.

Top body section B comprises a roof deck 25, side walls 26 which may have windows 27 therein, a front wall 28, a windshield 29 sealed into a slot in front wall 28 and extending into side walls 26, and sill plates 30 (FIGS. 4, 5) extending inwardly in a common plane from the lower margins of sidewalls 26. Sill plates 30, in FIG. 5, are seated upon shoulders 14 and are in full sealing contact with sealant strips 16 in gutters 15. In FIG. 4, sill plates 30 are mounted on shoulders 14 by means of interposed spacer strips 34. Suitable fastening means such as bolts 31 are utilized to secure the sill plates 30 to the shoulders 14. Sill plates 30 project laterally outwardly from side panels 11 as in FIG. 9, in overhanging relation thereto. However, the outwardly bellied panels 11 extend nearly to the vertical planes of side walls 26, and the overall design effect is a pleasing one and much more of an integrated design than in the conventional camper, as may be seen in FIG. 1.

The lower section of front wall 28 is arranged with its front face abutted against the cut edge 22 of roof arch 23 (which edge is disposed in a vertical plane as previously described) and is sealed to roof arch 23 by a weather strip 33. The end portions of this lower section of wall 28 extend across, seat upon, and are sealed to shoulders 14 at the forward end portions thereof. The wall 28 is securely attached to sidewalls 26 and cooperate therewith in solidly supporting top section B on shoulders 14. A transverse horizontal base arch 5, bridging between and secured to the front wall 28 and side walls 26 in the lower margin of the windshield slot, provides a seat for the lower margin of the windshield 29, while a header plate 36, also attached to front wall 28 and side walls 26, caps the upper margin of the windshield 29 and seals it to top deck 25.

Rear end section C (FIG. 6) comprises a pair of vertical side panels 40 constituting downward extensions of upper side panels 26; a floor extension section 41 bridging between the side panels 40, a pair of offset panels 42 joined to the forward margins of side panels 40 and extending inwardly in a common plane normal to sides 26, 40; a pair of closure panels 43 (FIGS. 1 and 6) extending forwardly from the inward margins of offset panels 42 into the opening defined between rear door posts 13, abutted against the inner margins thereof, and secured and sealed thereto by angle-iron weather seal strips 44 (FIGS. 7 and 8); a rear end wall 45 closing the rear end of the camper body B, C; and an extension 46 of roof 25 over the upper margin of rear wall 45. Closure panels 43 (FIG. 8) close the generally triangular gaps between the offset walls 42 and the door posts 13, which normally are disposed on a downward and rearward slope in the conventional panel truck. Correspondingly, offset walls 43 close generally triangular gaps defined between downwardly and laterally outwardly sloping side walls 12 of the conventional panel truck, the side walls 40 projecting laterally just slightly beyond the lateral extremities of the side walls 12 at the widest portion of the panel truck body, defined between outwardly bulged lower portions of side panels 12. Thus there is created a general impression of approximately flush relationship between panel truck side walls 12 and camper body sidewalls 26 and 40 (FIG. 1).

As an alternative construction in the joint between rear attachment body section and the rear end of the panel truck body, the rear end of the body can be cut away in a vertical plane, taking out the slanted door posts 13, and the offset panels 42 can be sealed directly to the cut edges of the resulting squared rear end of the panel truck body.

Roof 25 may project beyond the rear wall 45 to provide a storage recess 46 (FIG. 8) overhanging the rear wall 45. Wall 45 may have a rear window opening 47 or may utilize a large opening 47 to accommodate a rear end folding bed extension including a casing 48 hinged at 49 in the top of opening 48 near the roof level, and a fold-up bed 60 hinged at 61 at its one side in the lower end of casing 48, normally folded upwardly into casing 48, and adapted (upon swinging casing 48 to the rearwardly and upwardly extended position shown in phantom) to swing downwardly to a horizontal use position in which its other side rests upon rear wall 45 at the bottom of rear opening 47. Such a bed can accommodate two persons lying transversely of the camper, and can be folded up into the casing 48 when not in use, so as to allow casing 48 to be lowered to the position shown in full lines, and latched to rear end wall 45 to close the opening 47.

The rear section C of the camper attachment body provides, in its respective lateral extremities, lateral extensions of the main body space defined between the side panels 12 of the panel truck, which may be used to accommodate seats, folding bed, cabinets, kitchen utilities such as stove, refrigerator and sink, and other utilities customarily carried in a camper, or to provide an entry vestibule for door 17A (FIG. 2).

The rear end wall 45 functions to provide transverse rigidity in the rear section C of the attachment body which in turn provides transverse bracing between door posts 13 of the panel truck. Similarly, the roof 25 provides transverse rigidity in the top section B of the attachment body, which, through the joining of sills 30 to the shoulder flanges 14, provides transverse bracing between panel truck sides 12. The resistance of the top attachment section B to crushing or other damage in the event of a highway accident is greatly increased by its shallow depth and by its elevated position, the original panel truck sides 12, of metal, absorbing substantially all of the impact of any collision with a conventional passenger vehicle.

For greatly increased strength, the invention provides a laminated wall section (FIG. 3) of greatly increased structural strength. An outward sheathing 50 of one-quarter inch plywood, and an inward lining 51 of decorative finish three-sixteenths inch plywood, are laminated to opposite faces of sheets 52 of one inch cellular plastic material such as Styrofoam, and to opposite faces of 1" x 3" frame studs 53. Outer faces of sheathing 50 are covered by an aluminum skin 54.

The original floor 55 of the panel truck is covered by a covering floor 56 (FIG. 8) of plywood or the like, which is positioned flush with extension floor section 41 of rear body section C. The inner surfaces of panel side walls 12 are preferably lined with lining panels 57 of plywood or the like, covering the vertical reinforcing posts 58 (FIG. 5) of the panel truck body, and covering slabs of cellular plastic material 59 which are fitted between the posts 58 (FIG. 4). Interior cabinet work, etc. is then anchored to such lining panels 57.

I claim:
1. In combination with a panel truck comprising a body including side panels having upper margins embracing a top opening and having rear margins embracing an open rear end;
   an attachment camper body including:
      a horizontal top section of shallower depth than said camper body, said top section being supported on, attached and sealed to said upper margins and providing transverse bracing therebetween and providing a closure over said top opening; and
      a vertical rearward extension section including a rear end wall, vertical side walls joined to the lateral margins of said end wall, and means, on the forward extremities of said side walls, joined to said rear margins, whereby said extension section functions to close said open rear end and to provide transverse bracing between said rear margins.

2. The combination defined in claim 1, wherein said panel truck side panels are of downwardly and outwardly sloping bulged contour and said attachment body projects slightly beyond the portions of greatest width of said side panels.

3. The combination defined in claim 2, wherein said rear section includes vertical side walls and offset walls extending inwardly from the forward margins of said vertical side walls and joined to said rear margins.

4. The combination defined in claim 3, wherein said panel truck body includes rear door posts, and said rearward section further includes closure panels joined to and projecting forwardly from the inward vertical margins of said offset walls and joined to said door posts, said door posts slanted downwardly and rearwardly and said closure panels closing generally triangular gaps defined between the upward portions of said door posts and said offset walls.

5. The combination defined in claim 4, wherein said closure panels are abutted against the opposed inward margins of said door posts, and further including sealing strips of angle iron secured to the outer faces of said offset walls and of said door posts respectively.

6. The combination defined in claim 1, wherein said top section includes vertical side walls and horizontal longitudinal sills joined to and extending inwardly from the lower margins of said side walls, said sills resting upon and secured to said upper margins of said truck side panels.

7. The combination defined in claim 1, wherein said top section includes vertical side walls and horizontal longitudinal sills joined to and extending inwardly from the lower margins of said side walls, said sills resting upon and secured to said upper margins of said truck side panels, and sealing strips of angle section secured to the outer faces of said side panels along said upper margins thereof and to the under faces of said sills along their inward margins.

8. In combination with a panel truck comprising a body including side panels having upper margins embracing a top opening and having rear margins embracing an open rear end;
    an attachment camper body including:
        a horizontal top section of shallower depth than said camper body, said top section being supported on, attached and sealed to said upper margins and providing transverse bracing therebetween and providing a closure over said top opening; and
        a vertical rearward extension section including a rear end wall, vertical side walls joined to the lateral margins of said end wall, and means, on the forward extremities of said side walls, joined to said rear margins, whereby said extension section functions to close said open rear end and to provide transverse bracing between said rear margins;
    said top section including vertical side walls and horizontal longitudinal sills joined to and extending inwardly from the lower margins of said side walls, said sills resting upon and secured to said upper margins of said truck side panels; said truck side panels further including shoulder flanges extending generally horizontally inwardly and rain gutters along the outer sides of said shoulder flanges;
    and sealing strips resting in said rain gutters, said sills resting upon said shoulder flanges and projecting over said gutters and their under faces contacting said sealing strips to weather-seal said top section to said side panels.

9. In combination with a panel truck comprising a body including side panels having upper margins embracing a top opening and having rear margins embracing an open rear end;
    an attachment camper body including:
        a horizontal top section of shallower depth than said camper body, said top section being supported on, attached and sealed to said upper margins and providing transverse bracing therebetween and providing a closure over said top opening; and
        a vertical rearward extension section including a rear end wall, vertical side walls joined to the lateral margins of said end wall, and means, on the forward extremities of said side walls, joined to said rear margins, whereby said extension section functions to close said open rear end and to provide transverse bracing between said rear margins;
    said truck including a driver's cab having an arched roof open in its rearward portion so as to embody a rearwardly-facing edge disposed in a transverse substantially vertical plane, and said horizontal top section having a transverse vertical front wall abutted against and sealed to said edge to close the forward extremity of said top opening.

10. A camper body comprising, in combination with a panel truck body including a driver's cab having a top opening and a floor, said truck body being open above said floor and at its rear end;
    an attachment camper body including:
        a main body section secured to and providing a closure for said open truck body over said floor;
        a forward extension section projecting over said cab and closing said top opening; and
        a vertical rearward section projecting downwardly to the level of said floor;
    said cab including a transversely arched narrow forward roof portion defining the forward extremity of said top opening;
    and said forward extension section including means joining and sealing it to said narrow roof portion to seal said top opening.

11. A camper body as defined in claim 10:
    said transversely, arched, narrow forward roof portion having a rearwardly facing edge disposed in a transverse, substantially vertical plane;
    and said forward extension section of the camper body having a transverse vertical front wall abutting and sealed to said edge to close the forward extremity of said top opening.

References Cited

UNITED STATES PATENTS

| | | | |
|---|---|---|---|
| 3,186,755 | 6/1965 | Ward | 296—27 |
| 3,185,518 | 5/1965 | Zentner | 296—23 |
| 2,728,702 | 12/1955 | Simon | 296—31 |
| 3,003,810 | 10/1961 | Kloote | 296—31 |
| 3,325,205 | 6/1967 | Girski | 296—23 |
| 3,248,083 | 4/1966 | Gennaro | 296—23 |
| 3,324,487 | 6/1967 | Hiett. | |

PHILIP GOODMAN, Primary Examiner

U.S. Cl. X.R.

52—69; 296—31